UNITED STATES PATENT OFFICE.

BENNO HOMOLKA, OF FRANKFORT-ON-THE-MAIN, AND AUGUST STOCK, OF HÖCHST-ON-THE-MAIN, GERMANY, ASSIGNORS TO THE FARBWERKE, VORMALS MEISTER, LUCIUS & BRÜNING, OF HÖCHST-ON-THE-MAIN, GERMANY.

PROCESS OF MAKING AMIDOBENZALDEHYD.

SPECIFICATION forming part of Letters Patent No. 640,564, dated January 2, 1900.

Application filed May 31, 1898. Serial No. 682,160. (No specimens.)

*To all whom it may concern:*

Be it known that we, BENNO HOMOLKA, doctor of philosophy, a citizen of the Empire of Austria-Hungary, residing at Frankfort-on-the-Main, and AUGUST STOCK, a citizen of the Empire of Germany, residing at Höchst-on-the-Main, Germany, have invented certain new and useful Improvements in Processes of Manufacturing Ortho- and Para-Amidobenzaldehyd, of which the following is a description.

This invention relates to the production of ortho- and para-amidobenzaldehyd.

The para- and ortho-amidobenzylidene-anilins, as well as their sulfonic acids, decompose, as is known, by the action of diluted mineral acids into anilin base (or its sulfonic acid) and amidoaldehyd, according to the following equation:

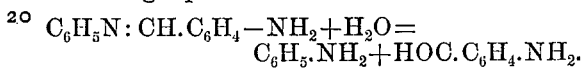

$$C_6H_5N : CH.C_6H_4 - NH_2 + H_2O = C_6H_5.NH_2 + HOC.C_6H_4.NH_2.$$

The amidobenzaldehyds are by this process, however, not obtained as such, but in form of their products of polymerization. We succeeded, however, in finding means which permit the isolation of the simple not polymerized amidoaldehyds. These processes are based upon observations that, on the one hand, the amidobenzylidene bases and their sulfonic acids, being so little stable, decompose when boiled with water into amidoaldeyhd and the anilin base, (or sulfonic acid,) and, on the other hand, amidobenzylidene bases and their sulfonic acids when treated with a solution of bisulfite readily decompose into the anilin base (or its sulfonic acid) and the bisulfite compound of the simple normal amidoaldehyd, from which compound may be separated by means of diluted alkalies. Which of these two processes is to be employed depends upon the physical properties of the products of decomposition of a given amidobenzylidene compound, especially upon its solubility and volatility with steam. We proceed, for instance, as follows:

I. *Ortho-amidobenzaldehyd.*—Ortho-amidobenzylidene-anilin sulfonic acid or one of its homologues or its salts is simply distilled with steam. The resulting ortho-amidobenzaldehyd goes over with the steam, while the not volatile anilin sulfonic acid remains behind. From the distillate the ortho-amidobenzaldehyd may be obtained according to the directions of Friedländer and Goehring, (Ber., XV, 2,572, and XVII, 456.) This method would be less suitable for the manufacture of para-amidobenzaldehyd, as it is not volatile with steam. It is preferable here to use the bisulfite method.

II. *Para-amidobenzaldehyd.*—On fifty parts, by weight, of amidobenzylidene-anilin or the equivalent quantity of one of its homologues are poured one hundred liters of a bisulfite solution of forty-five per cent. and distilled with steam for so long as anilin (or its respective homologue) is still to be traced in the distillate. The remaining yellow solution in the retort is filtered off from some resin and treated with an excess of a fixed alkali or alkaline carbonate. A small portion of the para-amidobenzaldehyd thus set free is precipitated as a yellow amorphous powder and is filtered off. From this filtrate is obtained the greater quantity of para-amidobenzaldehyd as a quickly-solidifying yellow oil. If para-amidobenzylidene-anilin or its homologues be distilled with steam in the absence of bisulfite, the base in question goes likewise over and the aldehyd remains as an amorphous yellow-red mass.

Having now described our invention, what we claim is—

The process of manufacturing amidobenzaldehyds, which consists in linking, as herein described, the elements of water to the amidobenzylidene-anilin compounds, and separating the mixture of anilin base and aldehyd thus obtained in the usual manner, substantially as set forth.

In testimony that we claim the foregoing as our invention we have signed our names in presence of two subscribing witnesses.

BENNO HOMOLKA.
AUGUST STOCK.

Witnesses:
HEINRICH HAHN,
BERNHARD LEYDECKER.